May 19, 1959 P. V. TERRY 2,887,043

CONDITION RECORDING APPARATUS

Filed Dec. 26, 1956

Inventor:
Paul V. Terry
by Richard E. Hosley
His Attorney

United States Patent Office 2,887,043

Patented May 19, 1959

2,887,043

CONDITION RECORDING APPARATUS

Paul V. Terry, Eliot, Maine, assignor to General Electric Company, a corporation of New York Application December 26, 1956, Serial No. 630,688

2 Claims. (Cl. 101—93)

This invention relates generally to condition recording apparatus and more particularly to improvements in such apparatus wherein the record is produced by printing means.

Such apparatus usually includes suitable printing means arranged to present selected printing characters indicative of the magnitude of a condition under observation together with a recording tape, either self-inking or otherwise, and a platen which may be selectively actuated to press the tape against the printing characters to form a record. It is very important in such devices to have all of the parts thereof in precise alignment to be sure that the tape is pressed uniformly against all portions of the printing characters so that a clear legible record is obtained. This is particularly important in the case of condition recording devices, for such devices must often function unattended for long periods of time, collecting a great deal of printed data for subsequent use. Without a clear, legible record of the data so collected, such devices would be practically worthless for many purposes.

For example, in the art of demand metering, printing recorders are used to record kilowat demand and the record produced is relied upon for numerous purposes, such as billing, load scheduling, and the like, and it is quite important to have reliable readable records at all times. Despite extreme care in the design and manufacture of printing demand meters, and even with regular servicing and adjustment during use, it has been found that the printing mechanism will sometimes become misaligned, resulting in smudged, partial, or otherwise illegible records.

It is therefore an object of this invention to provide an improved printing arrangement for a recorder wherein the printing mechanism is substantially self-aligning at all times to thereby produce a clear and legible record.

It is another object of the invention to provide a self-aligning printing mechanism which is not only effective and reliable but can be easily and economically manufactured.

The invention comprises a printing recorder in which a novel self-aligning platen will automatically position itself to uniformly press a recording tape against selected printing characters. The platen may be mounted on an actuating arm for selective printing, as desired, and self-aligning is obtained through a ball-and-socket joint connecting the platen to the arm.

The invention, together with its objects and advantages, will be readily understood upon reference to the detailed description set forth below, particularly when taken in conjunction with the drawing annexed hereto, in which.

Figure 1:
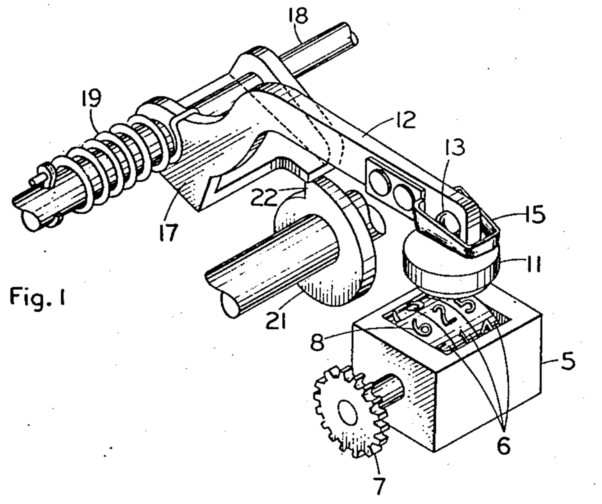
Figure 1 is a partial perspective view showing the invention when embodied as a part of a condition recording device, which in the form illustrated, is a recording kilowatt demand meter.
Figure 3:
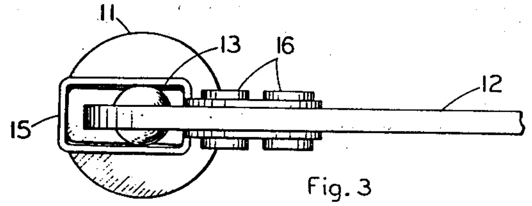
Figure 3 is a top view of the platen shown in Figures 1 and 2.

Referring now to the drawing, there is shown a portion of a condition recording device, which in the form illustrated happens to be a printing kilowatt demand meter. Such devices are well known in the art, a typical example of which is shown in Hall Patent No. 1,742,072, assigned to the same assignee to which the subject invention is assigned. Upon reference to the Hall patent, it is seen that the recorder actually counts the demand impulses as they are transmitted thereto and periodically records the number of impulses counted in any preselected demand interval. In the Hall arrangement, a platen is actuated to press a recording tape, and its associated carbon ribbon, against selected printing characters to record the number of demand impulses in each demand interval.

In the arrangement shown herein, the overall Hall scheme may be followed to record demand, but the printing mechanism has been considerably altered to both improve and simplify the resulting demand meter. Thus, the demand impulses are counted by a counting mechanism 5 which has a series of juxtaposed counting wheels 6 mounted within the counter and actuated by the gear 7 which may in turn be selectively indexed by any suitable pulse counting mechanism, such as that shown in the aforesaid Hall patent. The counter 5 is arranged to count as many as 999 demand impulses in any demand interval, and like in the Hall patent, it may be reset to zero after its setting has been recorded at the end of the demand interval. For the precise form of the printing demand meter with which the subject invention is used, reference may be had to the co-pending application of Paul V. Terry entitled "Printing Demand Meter" filed October 4, 1957, Serial No. 688,257 and assigned to the assignee of the present invention.

The counter 5 also forms a part of the printing mechanism in that each of its wheels 6 is a printing wheel having its numbers in the form of printing characters 8 arranged around the peripheral surface thereof.

A record tape 9 is arranged to selectively move across the top of the counter 5, overlying the printing wheels 6, being fed through the meter by any conventional means well understood by those skilled in the art. The tape 9 may be of the "self-inking" type, that is, it may be one of the commercially available pressure sensitive recording papers which produce a printed record upon firm contact with the printing characters, without requiring a carbon ribbon or other form of external inking member.

To press the tape 9 against the selected printing characters, there is provided the self-aligning platen 11, universally mounted on an actuator arm 12, by means of a ball 13 rigidly affixed to the platen and a socket 14 formed in the arm. The platen 11 is shown as a circular member, having a diameter wide enough to span the printing characters formed on the wheels 6, and it may be formed of metal, with its striking surface faced with a resilient material to produce a printed record of uniform density.

It is to be noted that the ball 13 is affixed to the center portion of the platen 11 and has a diameter substantially greater than the thickness of arm 12, whereby a substantial portion of the ball protrudes from the socket 14 on opposite sides of arm 12. The ball is held in the socket by means of an auxiliary supporting member which is in the form of a spring member 15 arranged as a yoke extending around the end of arm 12 and bearing against the protruding portions of the ball below its center line. The sides of the spring member which engage the ball are slanted at an angle of 15 degrees to the vertical to enable them to hold the ball securely in the socket.

From the above, it is apparent that the platen is securely mounted on arm 12 but is free to tilt in any direction relative to a plane parallel with the plane of the selected printing characters to align itself properly with the printing characters.

To allow the platen to move relative to the printing characters, the inner end of arm 12 has a hub portion 17 mounted on a stationary supporting shaft 18, with a coil spring 19 connected to the hub to urge the arm and platen toward the printing counter 5. A portion of the hub bears against a cam 21, and in the position shown in Figure 1, the cam acts as a stop for the hub, restraining it from moving freely under the urging of spring 19 to thereby hold the platen above the record tape.

Figure 2:
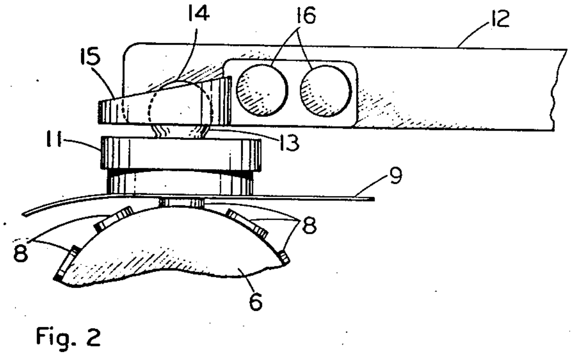
Figure 2 is a partial side view of the arrangement shown in Figure 1, with certain of the parts removed for the sake of clarity.

The cam may be rotated by a suitable mechanism and is configured so that before printing, tension is built up in spring 19. When the cam rise 22 passes from beneath the hub portion, the hub portion is no longer restrained, and the energy stored in spring 19 will drive the hub down, with the platen 11 being driven onto the tape to press it against the printing characters, this position of the platen being shown in Figure 2.

At the time printing occurs, the selected printing characters and contiguous portions of tape 9 lie in substantially parallel planes with the platen moving through an arcuate path, which at the end thereof, is in a direction substantially perpendicular to the aforesaid parallel planes. Actually the direction of the platen need not be perpendicular to the plane of the printing characters for the platen will automatically tilt to align itself with this plane upon initial contact with the characters, after which the tape is uniformly pressed against the printing characters.

Thus, small misalignments in any direction are permissible between the platen and the printing characters, either in manufacture or subsequent use, without affecting the printed record, since the platen will automatically position itself for optimum printing. Therefore, not only is the resultant recorder more reliable when in use, but it is more economical to manufacture, in view of the fact that looser manufacturing tolerances can be permitted and yet automatically compensated for by the universal mounting of the platen.

A further advantage of the ball-and-socket joint enhances the wearing characteristics of the platen, for it has been found that during printing the platen tends to rotate a slight amount—about an axis substantially perpendicular to the plane of the printing characters—and this slight rotation allows the platen to wear evenly for a longer life.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a printing demand meter, in combination: a demand impulse counting mechanism having a plurality of juxtaposed number wheels, each wheel having its numbers in the form of printing characters arranged on its peripheral surface whereby the printing characters presented by each wheel when taken together at any given time are indicative of the total number of demand impulses counted by the counting mechanism, a printing tape adapted to be periodically pressed against said presented characters to form a record on said tape of the number of demand impulses counted by the counting mechanism prior to printing, said tape and said presented characters lying in substantially parallel planes at the time printing occurs, means for pressing said tape against said presented characters comprising a circular self-aligning platen, the platen having a diameter that is wide enough to span all of the presented characters, an actuator on which the platen is mounted for moving the platen relative to the presented characters, said platen travelling in a direction substantially perpendicular to said planes at the time printing occurs, said actuator being in the form of a pivotally mounted arm having a ball receiving socket formed in the free end thereof, said platen having a ball securely affixed to its center section with a portion of the ball lying within the socket, the actuator arm having a thickness less than the diameter of the ball whereby the middle portion of the ball protrudes from the socket on opposite sides of the arm, and means for holding the ball in the socket comprising spring means in the form of a yoke which extends around the free end of the actuator arm and has its side portions in the form of flat sections which are inclined toward each other to form an open-bottomed substantially V-shaped trough which bears against the ball on both protruding sides below the ball center-line.

2. The combination defined by claim 1 in which the platen is in the form of a metallic member which has its striking surface faced with a resilient material.

References Cited in the file of this patent

UNITED STATES PATENTS

| | | |
|---|---|---|
| 16,270 | Evens | Dec. 23, 1856 |
| 174,017 | Sigwalt | Feb. 22, 1876 |
| 983,153 | Lowe | Jan. 31, 1911 |
| 1,104,564 | Snyder | July 21, 1914 |
| 1,109,480 | Stevens | Sept. 1, 1914 |
| 1,495,210 | Smith | May 27, 1924 |
| 1,675,969 | Bull | July 3, 1928 |
| 1,972,020 | Kline | Aug. 28, 1934 |
| 2,660,117 | Maunder | Nov. 24, 1953 |

FOREIGN PATENTS

| | | |
|---|---|---|
| 477,186 | France | Sept. 29, 1915 |